United States Patent [19]

Jones

[11] 4,067,711

[45] Jan. 10, 1978

[54] GLASSWARE FORMING MACHINES

[75] Inventor: Stanley Peter Jones, Doncaster, England

[73] Assignee: Emhart Industries, Inc., Farmington, Conn.

[21] Appl. No.: 687,771

[22] Filed: May 19, 1976

[30] Foreign Application Priority Data

May 28, 1975 United Kingdom ............... 23354/75

[51] Int. Cl.² ............................................. C03B 11/00
[52] U.S. Cl. ........................................ 65/319; 65/267; 65/356
[58] Field of Search ...................... 65/68, 83, 265, 267, 65/319, 356

[56] References Cited

U.S. PATENT DOCUMENTS 3,027,685  4/1962  Cooke .................................... 65/356

Primary Examiner—Arthur D. Kellogg
Attorney, Agent, or Firm—McCormick, Paulding & Huber

[57] ABSTRACT

There is described an improved method of cooling a blank mould used for the formation of a parison in glassware forming apparatus. Jets of cooling gas are delivered on to the outer mould surface through vertical rows of apertures and the gas which impinges on the outer mould surface is prevented from rebounding away from the mould surface but is caused to flow through a confined space close to the mould surface so that the cooling gas removes the boundary layer of air which is in contact with the outer mould surface and thereby markedly improves the cooling effect of the gas. Between the vertical rows of apertures there are provided vertical channels into which the cooling gas can expand and through which it will exhaust after it has effected cooling of the outer mould surface.

7 Claims, 2 Drawing Figures

GLASSWARE FORMING MACHINES

BACKGROUND OF THE INVENTION

In glassware forming apparatus a gob of molten glass is fed to a blank mould in which there is formed a parison which is a first stage in the formation of an article of glassware such as a bottle or a jar. Because the blank mould is continually receiving gobs of molten glass the blank mould becomes heated to a high temperature and heat must be dissipated from the blank mould in order to provide for the extraction of a necessary quantity of heat from the gob during the formation of the parison.

Conventionally, cooling of the blank mould is effected using a cooling gas, usually air. However, there exists, around the outer mould surface, a boundary layer of air which becomes heated to a temperature close to that of the outer mould surface and which is resistant to movement because of its closeness to the outer mould surface. Consequently this boundary layer of air constitutes an insulating layer which inhibits good heat transfer from the outer mould surface to the cooling gas. The boundary layer of air is penetrated by cooling gas where the cooling gas is directed at the outer mould surface, for example by jets. Provision has to be made for the cooling gas to exhaust between the jets and it has proved that adequate cooling of the blank mould by conventional means has required the use of either very high air pressures or very large volumes of the cooling air, both of which have their disadvantages.

SUMMARY OF THE INVENTION

It is an object of the present invention to provide a method and apparatus which enables a blank mould to be cooled in a more efficient manner so that a satisfactory cooling of the blank mould is achieved at relatively low air pressures and without the use of large volumes of cooling air.

According to the present invention there is provided a method of cooling a blank mould used for the formation of a parison in glassware forming apparatus comprising the steps of delivering jets of cooling gas on to a substantially vertical outer mould surface through apertures the outlets from which are arranged in a series of substantially vertical rows, confining the cooling gas flow adjacent the said outer mould surface in the regions surrounding the outlets of the apertures through which the gas was delivered whereby the cooling gas is caused to disturb the air which contacts the said outer mould surface over areas substantially greater than the areas contacted by the jets, and thereafter causing the cooling gas to exhaust through a series of substantially vertical channels which are interspersed with the said rows.

By confining the cooling gas flow adjacent to the outer mould surface immediately after delivery from the outlets of the apertures, the cooling gas is caused to perform a scrubbing action which removes the boundary layer of air from the outer mould surface over areas which are substantially greater than the areas of the jets themselves. This effective scrubbing action consequent upon the confinement of the cooling gas close to the outer mould surface results in a high heat transfer from the outer mould surface to the cooling gas over a series of substantially vertical areas or strips of the outer mould surface. The particularly efficient cooling of this series of substantially vertical areas of the outer mould surface leads to good cooling of the mould as a whole because the blank is relatively thick so that heat is readily conducted from the other parts of the mould into the vertical areas which are efficiently cooled by the method of the present invention.

The good heat transfer from the outer mould surface to the cooling gas which results from the confinement of the cooling gas adjacent the outer mould surface immediately after delivery enables satisfactory cooling of glass bottle moulds to be obtained whilst avoiding the use of high volumes of cooling gas.

The substantially vertical channels have a cross-sectional area which is large in relation to the cross-sectional area of the space within which the gas is confined adjacent the outer mould surface in order to effect the scrubbing action. The channels thus provide an exhaust path for the cooling gas, which offers little resistance to the gas flow. In consequence only a small back pressure exists as the gas passes into the vertical channels and therefore the presence of the vertical channels, interspersed with the vertical rows of apertures and the surrounding areas of gas confinement, is important in the provision of a cooling system for glassware forming apparatus which requires only a low pressure of cooling gas for good performance.

The performance of the method in accordance with the present invention involves the use of a cooling means in conjunction with the glassware forming mould such that the surfaces of the cooling means and the mould together provide vertical areas where the surface of the cooling means is closely spaced from the outer mould surface, these vertical areas being interspersed with other vertical areas where there is a relatively wide spacing between the mould surface and the surface of the cooling means. While this relative positioning of the two surfaces can be achieved by the provision of some shaping on the outer mould surface, it is preferred for vertical ribs to be provided on the cooling means.

The spacing of the surfaces of the vertical ribs from the outer mould surface must be kept a similar order of size to the diameters of the apertures in order for the advantages of the invention to be present. If the surfaces of the vertical ribs are too widely spaced from the outer mould surface in relation to the diameter of the apertures, the cooling gas will not be sufficiently confined adjacent the outer mould surface in order to disturb the air which is in contact with the outer mould surface by the scrubbing effect described above. On the other hand, if the surfaces of the vertical ribs are too close to the outer mould surface in relation to the diameters of the apertures, high pressures will be needed in order to force a sufficient volume of cooling gas between the opposed surfaces in order to effect adequate cooling.

Advantageously, the surfaces of the vertical ribs are spaced from the outer mould surface by a distance in the range of 0.5 to 2.0 times the diameters of the apertures and preferably all the apertures have similar diameters.

The widths of the surfaces of the vertical ribs are such that the edges of the ribs are separated from the edges of the apertures by a distance greater than the diameters of the apertures. Preferably the widths of the surfaces of the ribs are at least four times the diameters of the apertures.

DETAILED DESCRIPTION

Referring to the accompanying drawings there is shown a main body portion 1 of a blank mould. The main body portion 1 is the part of the blank mould which receives the gob of molten glass, and the blank mould is completed by the provision of neck rings upon the main body portion 1 or by the provision of both neck rings and an intermediate mould part upon the main body portion 1.

Figure 1:
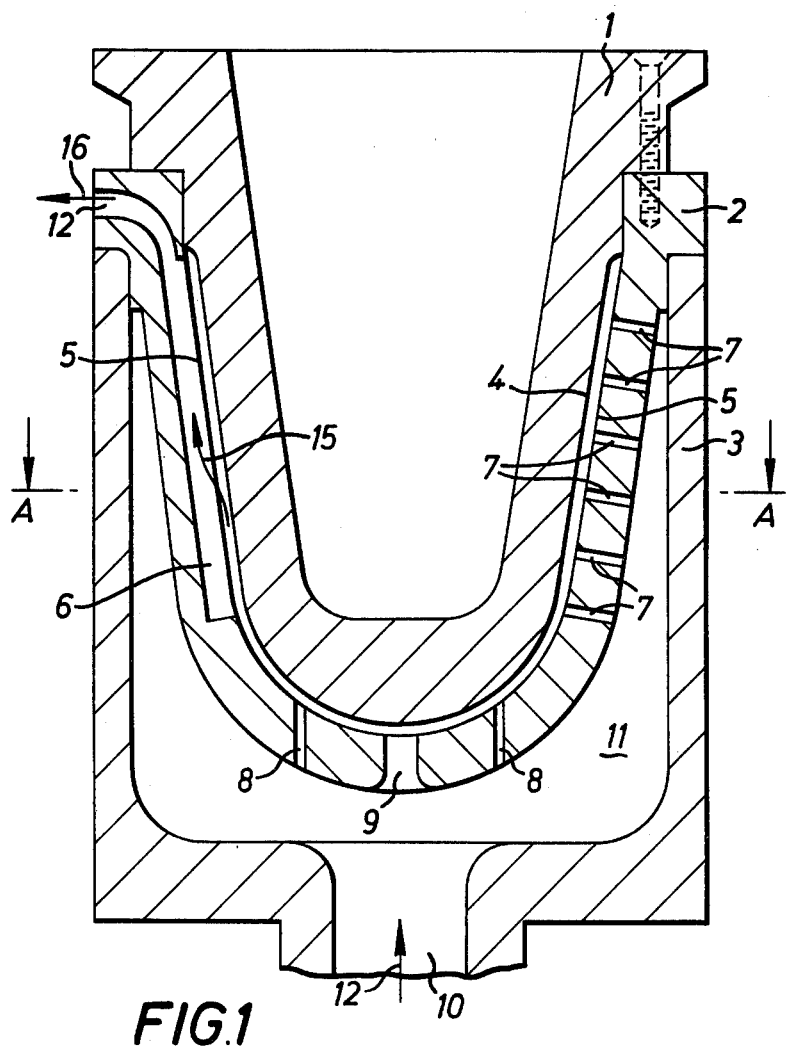
FIG. 1 is a vertical cross-section through a main body portion of a blank mould, the outer surface of which is associated with cooling means in accordance with the present invention, the section being taken along the line B—B of FIG. 2

The main body portion 1 of the blank mould is supported in a cooling insert 2 which in turn is supported by a mould holder 3. As may be readily seen from FIG. 2 the cooling insert 2 presents to an outer mould surface 4 of the main body portion 1 a series of substantially vertical ribs 5 which are separated from one another by a series of substantially vertical channels or slots 6. The section through the cooling insert 2 which is illustrated in FIG. 1 is selected so as to show one of the substantially vertical channels 6 in the left-hand half of the Figure, and a rib 5 in the right-hand half of the Figure. The rib 5 has a surface the contour of which essentially matches the contour of that part of the outer mould surface 4 which the rib 5 faces, and the rib 5 has in it a substantially vertical row of apertures 7 for directing jets of air on to the outer mould surface 4. The apertures 7 through the ribs 5 are all circular apertures of the order of 1 mm in diameter and the ribs 5, which taper from top to bottom, have a width of 4 mm at the narrowest parts of their surfaces and a width of 5 mm at the widest parts.

The substantially vertical ribs 5 and channels 6 extend as far down the inner surface of the cooling insert 2 as that part where the cooling insert 2 curves into a base portion of the insert 2 which base portion surrounds the bottom of the main body portion 1 of the blank mould. This base portion of the cooling insert 2 contains no channels but it does include further holes 8 and 9. The central hole 9 has a substantially larger diameter than the apertures 7 in the ribs 5, but the surrounding holes 8 in the base portion of the cooling insert 2 preferably have diameters of similar size to the diameters of the apertures 7.

The volume between the cooling insert 2 and the mould holder 3, which, apart from a passage 10 in the centre of its base, is a solid member, forms a plenum chamber 11 from which cooling air under pressure may be directed through the apertures 7 and the holes 8 and 9 against the outer mould surface 4.

In operation the passage 10 is connected to a source of cooling air which causes an increase of air pressure in the plenum chamber 11. In consequence cooling air is forced through the apertures 7 and the holes 8 and 9. A vertical line of jets of cooling air issuing from the vertical row of apertures 7 in each rib 5 of the cooling insert 2 therefore strikes the outer mould surface 4 opposite to each rib 5. The spacing between the outer mould surface 4 and the similarly shaped surface of the rib 5 is of the order of one millimeter with the result that the cooling air from the jets issuing from the outlets of the apertures 7 is confined adjacent to the outer mould surface 4 in the regions immediately surrounding the areas of the impacts by the jets of air delivered from the apertures 7. The boundary layer of air contacting the outer mould surface 4 is consequently disturbed over areas substantially greater than the areas struck by the jets.

Therefore substantial areas of the outer mould surface 4 opposite to the ribs 5 are scrubbed by the cooling gas which quickly takes up head from the outer mould surface before the cooling gas disperses sideways into the channels 6 on either side of each rib 5. The channels 6 are substantially vertically arranged and each lead into a shaped exhaust outlet 12 thereby providing for a ready discharge of the heated air from the space between the cooling insert 2 and the outer mould surface 4 of the main body portion 1. Each channel 6 has a substantially semi-circular cross section and a radius of the order of 5 millimeters.

The base portion of the cooling insert 2 which contains the holes 8 and 9 has a similar internal contour to the external contour of the base of the main body portion 1. However, the spacing between the external surface of the base portion of the main body portion 1 and the internal surface of the base portion of the cooling insert 2 is arranged to be of the order of 2 millimeters when the main body portion 1 of the blank mould is cold. The greater expansion of the main body portion 1 in relation to the cooling insert 2 reduces this spacing to about 1.5 millimeters at the operating temperature.

Figure 2:
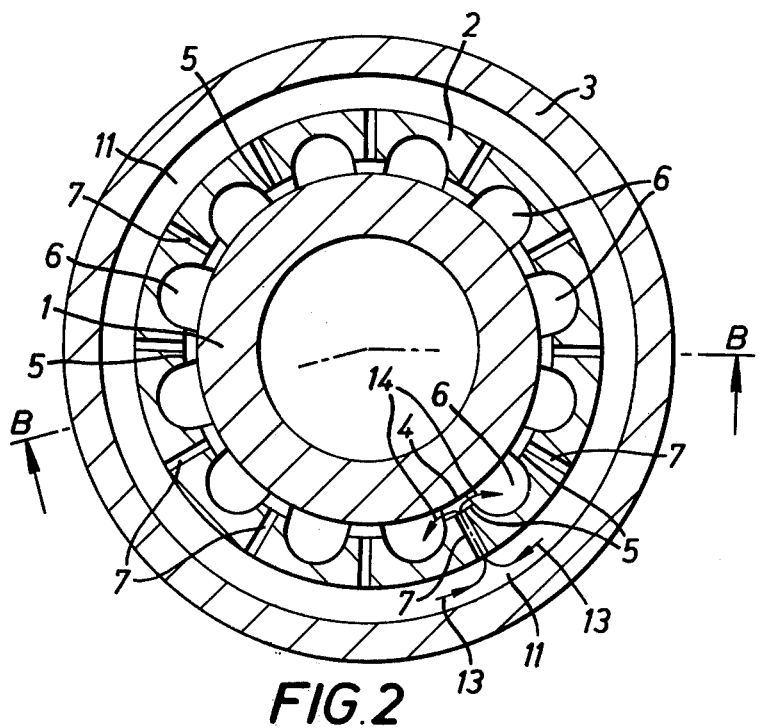
FIG. 2 is a horizontal cross-sectional view of the apparatus of FIG. 1 taken along the line A—A.

In the drawings the directions of air flow at different parts of the apparatus are indicated by arrows, of which arrow 12 in FIG. 1 shows the air flow through the passage 10 into the plenum chamber 11, arrows 13 and 14 in FIG. 2 show respectively the air flow from the plenum chamber 11 into one of the apertures 7, and the flow of the air after it emerges from the aperture 7, and arrows 15 and 16 in FIG. 1 show the movement of the air into one of the vertical channels 6 and out through the exhaust outlet 12.

Operation of the apparatus described with cooling air fed through the passage 10 to the plenum chamber 11 under a pressure of 30 pounds per square inch was found to give adequate cooling of a blank mould used for the manufacture of a parison as the first step of a two-stage glassware forming process for producing a jam jar. The effectiveness of the ribs 5 in confining the cooling air adjacent to the substantially vertical outer mould surface 4 and producing good heat transfer is illustrated by the fact that jets of cooling air delivered through nozzles similar to the apertures 7 and similarly positioned approximately 1 millimeter from the outer mould surface, but unsupported by the surfaces of the ribs 5 and the channels 6 which alternate with the ribs 5, was found to give inadequate cooling of the blank mould even when the cooling air was projected through the nozzles under a pressure of 60 pounds per square inch.

In an alternative arrangement in accordance with the present invention, satisfactory cooling of a blank mould was achieved using apertures 7 having a diameter of 1.2 millimeters in ribs 5 having a surface of minimum width of 5 millimeters. The surfaces of the ribs 5, which had contours matching the contours of the adjacent portions of the outer mould surfaces 4, were spaced 2 millimeters from the adjacent outer mould surface in this embodiment of the present invention.

I claim:

1. Glassware forming apparatus comprising an axially elongated blank mould for forming a parison from a gob of molten glass and annular means surrounding at least a part of the outer surface of the blank mould and defining therewith a circumferentially spaced series of first substantially axially extending regions in which the surrounding surface and the outer mould surface have substantially matching contours and are closely spaced radially from one another to form regions of gas confinement, the first substantially axial regions being separated from one another by a second series of substantially axial regions which constitute substantially axially extending exhaust channels, each channel cooperating with the mould surface to define a cross-sectional area which is large in relation to the cross-sectional area of the regions of gas confinement, said exhaust channels having a depth such that the inner walls thereof are spaced from said mould surface by a distance at least approximately 5 mm greater than the close radial spacing of said first axially extending regions, the internal surface of the annular means in the first series of substantially axially extending regions each defining a substantially vertical row of apertures for delivering cooling gas on to the closely spaced regions of the outer surface of the mould, the apertures being separated from the edges of the first axially extending regions on the surrounding surface by a distance significantly greater than the close radial spacing between the mould surface and said first axially extending region, and each of said apertures having a diameter comparable to said close radial spacing, which spacing is approximately 1 mm but less than 2 mm.

2. Glassware forming apparatus according to claim 2 wherein the surfaces of the first substantially vertical regions are more particularly defined by axially extending ribs on the said internal surface of the surrounding means.

3. Glassware forming apparatus comprising a blank mould including a main body portion for use in the formation of a parison from a gob of molten glass and cooling means for directing cooling gas on to an outer mould surface, the cooling means comprising an annular insert surrounding a major portion of the outer surface of the main body portion, the insert having an annular flange supported by the mould holder and forming with the mould holder a plenum chamber to which cooling gas may be fed, the insert including in a substantially axially extending part thereof a series of substantially axial ribs separated from one another by substantially axial channels, each rib having a surface with a contour similar to the contour of the outer mould surface adjacent to the rib, each rib having a row of apertures of similar diameters substantially aligned axially in the rib for directing cooling gas from the plenum chamber onto adjacent axial regions of the outer mould surface, the rib surfaces being spaced from the outer mould surface by a distance in the range of 0.5 to 2.0 times the diameter of the apertures, and each channel providing an expansion chamber for enabling exhaust gas to leave the space between the insert and the outer mould surface when heat transfer to the gas has been effected.

4. Glassware forming apparatus according to claim 3 wherein the apertures have a diameter of the order of 1 mm and wherein the rib surfaces are spaced from the outer mould surface by a distance of the order of 1 mm.

5. Glassware forming apparatus according to claim 4 wherein each channel has a semi-circular cross-section of radius of the order of 5 mm.

6. Glassware forming apparatus according to claim 3 wherein the apertures have a diameter of the order of 1.2 mm and wherein the rib surfaces are spaced from the outer mould surface by a distance of the order of 2 mm.

7. Glassware forming apparatus according to claim 6 wherein each channel has a semi-circular cross-section of radius of the order of 5 mm.

* * * * *

UNITED STATES PATENT OFFICE
CERTIFICATE OF CORRECTION

Patent No. 4,067,711          Dated January 10, 1978

Inventor(s) Stanley Peter Jones

It is certified that error appears in the above-identified patent and that said Letters Patent are hereby corrected as shown below:

Col. 4, line 6 "head' should be --heat--.

Col. 5, line 29 "claim 2" should be --claim 1--.

Signed and Sealed this

Thirteenth Day of June 1978

[SEAL]

Attest:

RUTH C. MASON
Attesting Officer

DONALD W. BANNER
Commissioner of Patents and Trademarks